US012508602B2

(12) United States Patent
Böckle et al.

(10) Patent No.: US 12,508,602 B2
(45) Date of Patent: Dec. 30, 2025

(54) MOBILE ROCK PROCESSING APPARATUS WITH IMPROVED PLANNING OF A DISCONTINUOUS MATERIAL FEED

(71) Applicant: Kleemann GmbH, Göppingen (DE)

(72) Inventors: Tobias Böckle, Weinstadt (DE); Thomas Kühnle, Kirchheim / Teck (DE)

(73) Assignee: Kleemann GmbH, Göppingen (DE)

( * ) Notice: Subject to any disclaimer, the term of this patent is extended or adjusted under 35 U.S.C. 154(b) by 243 days.

(21) Appl. No.: 18/353,332

(22) Filed: Jul. 17, 2023

(65) Prior Publication Data

US 2024/0024889 A1 Jan. 25, 2024

(30) Foreign Application Priority Data

Jul. 19, 2022 (DE) ..................... 10 2022 118 032.8

(51) Int. Cl.
*B02C 23/14* (2006.01)
*B02C 9/04* (2006.01)
(Continued)

(52) U.S. Cl.
CPC .............. *B02C 23/14* (2013.01); *B02C 11/04* (2013.01); *B02C 13/06* (2013.01); *B02C 13/286* (2013.01);
(Continued)

(58) Field of Classification Search
CPC ....... B02C 23/14; B02C 13/06; B02C 13/286; B02C 23/12; B02C 25/00; B02C 9/04; B02C 2013/28609
See application file for complete search history.

(56) References Cited

U.S. PATENT DOCUMENTS

| | | | | |
|---|---|---|---|---|
| 1,487,934 A * | 3/1924 | Gould | B02C 11/04 209/365.2 |
| 2,632,584 A * | 3/1953 | Zuber | B02C 11/04 222/281 |

(Continued)

FOREIGN PATENT DOCUMENTS

| | | |
|---|---|---|
| CN | 101952692 A | 1/2011 |
| CN | 102076417 A | 5/2011 |

(Continued)

OTHER PUBLICATIONS

Corresponding co-pending U.S. Appl. No. 18/353,344.

(Continued)

*Primary Examiner* — James R Bidwell
(74) *Attorney, Agent, or Firm* — Lucian Wayne Beavers; Patterson Intellectual Property Law, PC

(57) ABSTRACT

A rock processing apparatus is provided for crushing and/or sorting granular mineral material according to size. The rock processing apparatus comprises a material feeding apparatus including a material buffer, at least one working unit of at least one crushing apparatus and at least one screening apparatus, at least one conveyor apparatus for conveying material between two apparatus components, a control unit for controlling apparatus components, at least one sensor for detecting at least one operating parameter, the sensor being connected to the control unit for transmitting a detection signal, at least one output device for outputting information and connected to the control unit. The control unit is designed to ascertain, in an operation with discontinuous material feed, and based on the at least one detection signal, time information about a future material feed, wherein the output device is designed to output the ascertained time information.

17 Claims, 4 Drawing Sheets

(51) Int. Cl.

| | |
|---|---|
| ***B02C 11/04*** | (2006.01) |
| ***B02C 13/06*** | (2006.01) |
| ***B02C 13/286*** | (2006.01) |
| ***B02C 23/12*** | (2006.01) |
| ***B02C 25/00*** | (2006.01) |

(52) U.S. Cl.

CPC .............. *B02C 23/12* (2013.01); *B02C 25/00* (2013.01); *B02C 9/04* (2013.01); *B02C 2013/28609* (2013.01)

(56) References Cited

U.S. PATENT DOCUMENTS

| | | | | |
|---|---|---|---|---|
| 4,281,800 | A | 8/1981 | Flavel | |
| 4,909,449 | A | 3/1990 | Etheridge | |
| 8,770,501 | B2 | 7/2014 | Laukka et al. | |
| 10,730,056 | B2 | 8/2020 | Maunula et al. | |
| 11,325,132 | B2 | 5/2022 | Schmid et al. | |
| 11,383,246 | B2 | 7/2022 | Eckert et al. | |
| 11,517,915 | B2 | 12/2022 | Hommel et al. | |
| 11,925,939 | B2 | 3/2024 | Meier et al. | |
| 12,115,556 | B2 * | 10/2024 | Rafferty | B02C 21/02 |
| 2004/0200914 | A1 | 10/2004 | Hishiyama et al. | |
| 2006/0022074 | A1 | 2/2006 | Garvin et al. | |
| 2010/0091103 | A1 | 4/2010 | Peltonen et al. | |
| 2010/0193619 | A1 * | 8/2010 | Robinson | B02C 21/026 241/245 |
| 2010/0312503 | A1 | 12/2010 | Fux et al. | |
| 2021/0154706 | A1 | 5/2021 | Dirscherl et al. | |
| 2021/0325899 | A1 | 10/2021 | Grambihler et al. | |
| 2024/0024890 | A1 * | 1/2024 | Böckle | B07B 1/005 |

FOREIGN PATENT DOCUMENTS

| | | | | | |
|---|---|---|---|---|---|
| CN | 104768662 | A | | 7/2015 | |
| CN | 111788004 | A | | 10/2020 | |
| CN | 112317103 | A | * | 2/2021 | B02C 23/02 |
| CN | 112619870 | A | | 4/2021 | |
| CN | 114247536 | A | | 3/2022 | |
| DE | 102017124958 | A1 | | 4/2019 | |
| DE | 102020003966 | A1 | | 1/2022 | |
| DE | 102020125132 | B4 | * | 10/2024 | B02C 13/06 |
| WO | 2020007846 | A1 | | 1/2020 | |

OTHER PUBLICATIONS

Corresponding co-pending U.S. Appl. No. 18/353,357.

Corresponding co-pending U.S. Appl. No. 18/353,367.

European Search Report for corresponding patent application No. 23185111.4, dated Jan. 2, 2024, 5 pages.

China Office Action for corresponding patent application No. 2025072400004700, dated Jul. 24, 2025, 8 pages.

* cited by examiner

MOBILE ROCK PROCESSING APPARATUS WITH IMPROVED PLANNING OF A DISCONTINUOUS MATERIAL FEED

CROSS-REFERENCES TO RELATED APPLICATIONS

This application claims benefit of German Patent Application No. 10 2022 118 032.8, filed Jul. 19, 2022, and which is hereby incorporated by reference.

FIELD OF THE INVENTION

The present disclosure relates to a rock processing apparatus for crushing and/or sorting granular mineral material according to size.

The present disclosure relates in particular to a mobile rock processing apparatus having a travel gear, which allows the rock processing apparatus to change its place of installation in self-propelled fashion and/or to move in self-propelled fashion between a place of installation for a rock processing operation and a transport means for transporting the rock processing apparatus. Because of the normally high weight of the mobile, in particular self-propelled, rock processing apparatus, the travel gear is usually a crawler travel gear, although a wheel travel gear is not to be ruled out as an alternative or addition to a crawler travel gear.

BACKGROUND

A rock processing apparatus of aforementioned type is known from U.S. Pat. No. 4,281,800. The previously known rock processing apparatus comprises both a screening apparatus as well as a crushing apparatus and is part of a rock processing system including a rock grinding mill downstream from the rock processing apparatus in the flow of material. From a quarry, the rock processing apparatus is continuously loaded by a conveyor belt with material to be processed.

In order to coordinate the output of the rock processing apparatus, which according to U.S. Pat. No. 4,281,800 has on average a lower availability per day than the rock grinding mill, but which is able to crush rock with a lower energy consumption than the rock grinding mill, with the output of the rock grinding mill and thus to operate the rock processing system as advantageously as possible, U.S. Pat. No. 4,281,800 proposes to ascertain an output, indicated as a quantity of material per unit of time, of the rock processing apparatus for a future period of time on the basis of an output of the rock processing apparatus determined for a complete operating time period, such as a day of operation for example, and a respective past output of the rock grinding mill on the one hand and of the rock processing apparatus on the other hand that has already been achieved since the beginning of the considered operating time period until the ascertainment time within the considered operating time period. Depending on the output of the rock processing apparatus ascertained for the future time period, the conveying capacity of the conveyor belt loading the rock processing apparatus is to be adjusted for the future time period.

U.S. Pat. No. 4,909,449 describes signaling, via a light system, for example a kind of traffic light system, to vehicles that load a rock processing apparatus discontinuously, whether the material feeding apparatus of the rock processing apparatus is at the moment ready to be fed with newly supplied rock or not.

U.S. Pat. No. 4,909,449 incidentally also discloses changing the conveying capacity of a conveyor apparatus between the material buffer and a crushing apparatus, and to do so as a function of the fill level of material to be processed in the material buffer and/or of the motor load of a discharge conveyor apparatus, which conveys processed material out of the rock processing apparatus.

US 2021/0325899 A1 discloses specifically to control a dumping body of conveyor trucks, which load a rock processing apparatus, in order to influence the unloading of the conveyor truck over a desired unloading period. By controlling the truck motor as well as hydraulic valves, a specific dumping profile of the dumping body is to be achieved in order to unload starting material transported in the dumping body toward the rock processing apparatus at a desired material delivery rate.

The effectiveness of changes of the conveying capacity, for example by changing the conveying speed, of a conveyor apparatus for conveying fed starting material from the material buffer to the working unit, in particular to a crushing apparatus, presupposes a correctly filled material buffer. In the case of discontinuous loading of the material buffer, however, this is not readily given. Basically, it is left to the operator personnel of loading apparatus loading the rock processing apparatus, possibly in cooperation with the machine operator of the rock processing apparatus, to decide regarding the loading of the material buffer of the rock processing apparatus. As a result, the operation of the rock processing apparatus and hence the resulting product delivered by the rock processing apparatus depend quite considerably on the abilities and experiences of the persons working on the respective apparatuses.

The light system described above indicates a current feed readiness of the rock processing apparatus as a function of the fill level of material to be processed in the material buffer, which basically only helps, but does not ensure, to avoid overloading the rock processing apparatus. An undersupply of the rock processing apparatus with material to be processed may occur, however, because the light system indicates the feed readiness only when this readiness actually exists. In the event of a sudden feed readiness, the material buffer and the working unit downstream from the material buffer may run empty, with the associated known disadvantages, or at least may be underfilled, since personnel at the loading apparatuses is possibly unable to respond sufficiently quickly to the suddenly indicated feed readiness of the rock processing apparatus.

It is also known to coordinate the output of rock processing apparatuses arranged together in series in the flow of material by adjusting the conveying capacity or conveying speed of conveying apparatuses continuously conveying material between the rock processing apparatuses. In this context, a discharge conveyor belt of an upstream rock processing apparatus is often the loading conveyor belt of a rock processing apparatus situated directly downstream. It is then possible to change the conveying capacity of the discharge conveyor belt as a function of the operating states of the downstream rock processing apparatus. This is in principle unproblematic for a continuous loading of material buffers. Things look differently, however, in an operation with discontinuous material feed, in which between two consecutive material feeds there may exist pauses of different lengths and especially unpredictably long pauses and where with every discontinuous material feed a different quantity of material may be fed.

BRIEF SUMMARY

It is therefore an object of the present disclosure to improve a rock processing apparatus of the type mentioned at the outset in light of the problem described above and in particular to allow for it to be operated in a manner that is as enduring as possible at an economical operating point.

A rock processing apparatus according to the present disclosure achieves the mentioned object in that the control unit is designed to ascertain, in an operation with discontinuous material feed, a piece of time information on the basis of the at least one detection signal, which represents an execution time of a future material feed into the material feeding apparatus, wherein the output device is designed to output the ascertained time information.

Since the detection signal, as described at the outset, represents at least one operating parameter detected by a sensor, the control unit is able to ascertain, on the basis of the at least one detection signal, a future requirement of material to be processed by the rock processing apparatus and thus to predict it as time information. By outputting the ascertained time information, third parties, such as for example a machine operator of a loading apparatus, are able to note the time information and consequently plan their material feed into the rock processing apparatus in advance. Alternatively, the ascertained and output time information may be processed in automated fashion by a data processing device, such as a control unit for example, of at least one loading apparatus and the loading operation of the latter may be set up and executed by considering the time information, so that at the execution time represented by the time information a material feed into the material feeding apparatus may in fact be performed.

The at least one operating parameter may be detected qualitatively and/or quantitatively. If more than one operating parameter is detected, then a portion of the operating parameters may be detected qualitatively and another portion may be detected quantitatively. Furthermore, it is also conceivable that at least one operating parameter is detected both quantitatively as well as qualitatively.

The execution time may be an execution point in time and/or an execution period of time. The execution time may indicate the earliest possible future time, at which or starting at which material may be or should be fed into the material feeding apparatus. The execution time may additionally or alternatively indicate a future time span, over which material may be or should be fed into the feeding apparatus.

The time information may be a relative time information with respect to a reference time, for example the current actual time. The time information may be output for example as a waiting time until the next material feed. Alternatively, the time information may be an absolute time information, which represents an execution time or a beginning of an execution time span as a time of day in the respective relevant time zone. If required, an end of the execution time span may again refer as absolute time information or as relative time information preferably to the beginning of the execution time span. Normally, it will suffice, however, to indicate as the execution time the point in time starting at which a material feed may be performed in the future.

At the time at which the time information is output by the output device, the execution time represented by the time information lies in the future. This concerns not only a theoretical future on the basis of signal transmission durations in the microsecond or nanosecond range, but a future, which is in the single-digit second range from the time of the output of the time information. Often, the execution time will be in the double-digit or even triple-digit or quadruple-digit second range in the future from the time of the output of the time information.

In the operation with discontinuous material feed, the rock processing apparatus is preferably designed to ascertain respectively an individual execution time as time information for at least two, particularly preferably for more than two consecutive future material feeds and to output these respectively via the output device. Thus, the execution times of a series of consecutive material feeds may be suitably ascertained and output as time information as a function of the at least one operating parameter represented by the at least one detection signal, that is, ascertained and output individually for the operating situation of the rock processing apparatus as it develops further due to the preceding material feed.

The rock processing apparatus may comprise only one or multiple screening apparatuses as the at least one working unit. The rock processing apparatus is then a pure screening system. In the same way, the rock processing apparatus may comprise only one or multiple crushing apparatuses as the at least one working unit. The rock processing apparatus is then a pure crushing system. In the preferred configuration, the rock processing apparatus comprises both at least one screening apparatus as well as at least one crushing apparatus. The screening apparatus may be a pre-screen situated upstream of the crushing apparatus in the flow of material, possibly having multiple screen decks, and/or it may be a post-screen situated downstream from the crushing apparatus in the flow of material in order to sort the result provided by the crushing apparatus according to grain sizes. The post-screen may also comprise at least one screen deck or multiple screen decks.

The crushing apparatus may be any known crushing apparatus, for example an impact crusher or a jaw crusher or a cone crusher or a roll crusher. If the rock processing apparatus has more than one crushing apparatus, these crushing apparatuses may be crushing apparatuses of the same kind or of different kinds. Each individual crushing apparatus may be one of the aforementioned crusher types: impact crusher, jaw crusher, cone crusher and roll crusher.

Although it is in principle possible that the control unit ascertains the time information exclusively from detection signals of the at least one sensor, it is not to be ruled out that the control unit also takes into consideration information input by a machine operator or another person when ascertaining the time information. For this purpose, a preferred development of the present disclosure may provide for the rock processing apparatus to comprise an input device for inputting information, the input device being connected in signal-transmitting fashion to the control unit for transmitting information. The control unit is preferably designed to ascertain, in operation with discontinuous material feed, the time information on the basis of the at least one detection signal and a piece of information input into the input device.

The input device may be any input device, such as a keyboard, a touchscreen and the like. The input device may also be connected to the control unit in signal-transmitting fashion via a cable link or a radio link, so that it is not necessary for it to be physically present on the rock processing apparatus. A signal-transmitting connection of the input device or of the at least one sensor to the control unit may also be a connection by interposition of a data memory, in which pieces of information input into the input device and/or pieces of information output by the at least one sensor for detecting the at least one operating parameter are stored as data and are retrieved as stored data by the control unit. The control unit therefore preferably comprises a data memory, which is connected to the control unit in signal-transmitting fashion. In this data memory, the control unit is able to store data provided by the input device and/or by the at least one sensor and is able to retrieve them again as stored data. The input device and/or the at least one sensor may also be connected directly to the data memory in signal-transmitting fashion, so that the input device is able to transmit information input into it as directly into the data memory for storage as the at least one sensor is able to transmit results of its detection operation.

Data, which do not change over the operational life of the rock processing apparatus, or which can be changed only with great effort, for example via the machine configuration of the rock processing apparatus and its components, may be stored permanently in the data memory and may be stored for example by the manufacturer of the rock processing apparatus during the manufacture of the same or prior to its delivery. Nevertheless, if the machine configuration should change, for example in the course of maintenance or repair, the service provider performing the maintenance or repair work is able to make appropriate changes to the content of the data memory.

The data memory may be connected to the control unit in signal-transmitting fashion by a physical signal line and/or wirelessly, for example by a radio link or by the transmission of optical signals. In principle, the data memory may therefore be provided separately and at a distance from the rest of the rock processing apparatus. The "rest of the rock processing apparatus" is here represented by its machine body. The machine body comprises the machine frame and all components of the rock processing apparatus connected to the machine frame, even when these are connected so as to be movable relative to the machine frame.

To ascertain the time information about a future material feed, in particular about the next material feed due, the at least one sensor may be designed to detect and transmit to the control unit at least one of the following operating parameters: fill ratio of the material buffer; fill ratio of at least one conveyor apparatus; conveying speed of at least one conveyor apparatus; fill ratio of at least one working unit; grain shape and/or grain size and/or grain size distribution of fed and/or conveyed material; type of fed and/or conveyed material; humidity of the fed material; density of the fed material; hardness of the fed material; crushability of the fed material; abrasiveness of the fed material; state of the fed material; quantity of returned oversize grain; feed quantity of material to be fed or already fed; operating load of at least one drive apparatus; operating load of at least one working unit; working speed of at least one working unit; dimension of a crush gap of the crushing apparatus; mesh aperture of a screen of the screening apparatus; size of a loading tool of a loading apparatus discontinuously loading the material buffer; quantity or proportion of, in particular non-crushable, foreign material.

In principle, one sensor suffices for detecting an operating parameter. In this context, however, already one and the same operating parameter may be detected by multiple sensors, for example if the fill ratio of the material buffer to be ascertained is not an average fill ratio, but rather a location-dependent local fill ratio. If more than one operating parameter is to be detected, the rock processing apparatus may have more than one sensor. The same applies, if more than one physical operating principle is to be used for detecting one or multiple operating parameters.

The fill ratio of the material buffer may be detected for example by one or multiple ultrasonic sensors. Additionally or alternatively, an optical detection by at least one camera as sensor and/or a tactile detection by a mechanical sensor is possible. The fill ratio of the material buffer, which is usually funnel-shaped, is a measure for the supply of material still to be processed in the rock processing apparatus.

The fill ratio of the material buffer may be represented by a fill level of the fed material in the material buffer. For this purpose, a single value of the fill level may be used as a representative value for an entire average fill level of the material buffer, or multiple local fill levels may be ascertained in order to increase the resolution of the filling of the material buffer. It is also conceivable, using optical methods such as laser scanning, to ascertain a profile of the surface of material fed into the material buffer and its height above the known bottom of the material buffer. The fill level or the local fill levels up to the surface profile of the fed material may already sufficiently represent the fill ratio. They may alternatively be related to the maximum holding capacity of the material buffer.

In this context, an overfilled material buffer, in particular a feed hopper, is to be avoided as much as an underfilled material buffer. In the case of an overfilled material buffer, material is lost in the feeding process, because it can slide off a material heap in the material buffer and fall alongside the material feeding apparatus. Furthermore, the conveying capacity of the material buffer may deteriorate, and the screening capacity of a pre-screen situated downstream from the material buffer may be influenced negatively when overloading the material buffer. Moreover, overfilling the material buffer may result in a pileup in a working unit, in particular in a crushing apparatus, downstream in the flow of material. An underfilled feed hopper may result in high stress on the conveyor apparatus connected to the material buffer, since material then strikes the conveyor apparatus directly during the feeding of material, which may cause increased wear and a higher noise emission.

The fill ratio of the material buffer and its temporal development is a particularly preferred operating parameter for ascertaining a next execution time of a future material feed. It is possible to ascertain, for example, when a fill ratio of the material buffer in the future reaches a predetermined minimum fill ratio, and then it is possible to infer from this information when the material buffer at the latest should be loaded anew in order to avoid it being underfilled. When ascertaining the execution time, it is of course possible to take into consideration a temporal safety margin so that interfering effects that exist on job sites do not affect the flow of material or affect it only to a slight degree. The term "job site" very generally includes any location of a production or provision of material to be processed by the rock processing apparatus, such as stone quarries, gravel pits, building demolition sites and the like. The term "mineral material" therefore includes both natural mineral material as well as mineral material produced by processing. The latter includes building materials as well as returned oversize grain.

The fill ratio of the material buffer is preferably detected repeatedly in order to ascertain a depletion rate of the material buffer. The rock processing apparatus preferably comprises a time measuring device, which is connected in signal-transmitting fashion to the control unit, possibly by interposition of the aforementioned data memory. The time measuring device may be integrated in the at least one sensor and/or in the input device and/or in the control unit. Via signals of the time measuring device, the control unit is able to assign an event time to detection events of the at least one sensor and/or input events of the at least one input device. From the time interval of at least two event times for an event of the same kind, for example the detection of one and the same operating parameter, the control unit is able to determine a rate of change associated with the respective events. Thus, the control unit is able to ascertain a rate of change of the fill ratio from two detections of the fill ratio of the material buffer and the known time interval between these detection events. From the ascertained rate of change and a fill ratio known by detection, the control unit is able to ascertain a next execution time for example by extrapolation, possibly by taking the aforementioned safety margin into consideration.

As an alternative or preferably in addition to the fill ratio of the material buffer, the fill ratio of at least one conveyor apparatus may be detected as the or a relevant operating parameter. Preferred in this context is the detection of the fill ratio of a conveyor apparatus conveying material from the material buffer to a working unit, in particular to a crushing apparatus. For the conveying capacity of a conveyor apparatus conveying material directly from the material buffer influences both the fill ratio of the material buffer as well as the fill ratio of the working unit, in particular the crushing apparatus, to which it conveys material. The equivalent applies for detecting a conveying speed of at least one conveyor apparatus, which preferably is again the conveyor apparatus conveying material between the material buffer and the working unit, in particular the crushing apparatus.

The product of fill ratio and conveying speed of a conveyor apparatus provides a measure for the volume conveyed by the conveyor apparatus or for the conveying capacity of the conveyor apparatus.

The conveyor apparatus may be a belt conveyor apparatus or a trough conveyor apparatus, the latter conveying preferably according to the micro throw principle as a vibrating conveyor. A vibrating conveyor, preferably in the form of a trough conveyor apparatus, is preferred especially as a conveyor apparatus for conveying material between the material buffer and a crushing apparatus. The rock processing apparatus may also comprise a plurality of conveyor apparatuses and will normally comprise such a plurality, for example because one and the same conveyor apparatus is not able to convey material as a feed conveyor apparatus from the material buffer to a working unit and as a discharge conveyor apparatus away from a working unit and out of the rock processing apparatus. In the case of a plurality of conveyor apparatuses, these may use different conveying principles, such as the micro throw principle in vibrating conveyors already described above and/or such as a belt conveyor, the belt conveyor being normally used as a discharge conveyor apparatus due to the smaller grain size occurring in the discharge and a usually more homogeneous grain size distribution.

A conveying speed of a conveyor apparatus may be ascertained in various ways. The conveying speed may be determined independently of the type of conveyor apparatus by detecting a motion in the conveying direction of a material lying on the conveyor apparatus, for example by a light barrier, by ultrasound, by optical detection and image processing and the like. A conveying speed of a belt conveyor may be detected by detecting the speed of a pulley cooperating with the conveyor belt, be it a support pulley or a drive pulley, or by directly detecting the track speed of the conveyor belt. In vibrating conveyors, the vibration amplitude and vibration frequency may be a measure for the speed of material supported on a vibrating conveyor, so that a detection of the vibration amplitude and of the vibration frequency is a detection of values of variables representing the conveying speed. For all conveyor apparatuses, it is also the case that their conveying capacity is derivable from the drive power of a motor that drives them, so that the conveying capacity can be derived indirectly from the detection of a motor torque and of a motor speed. For some types of electric motors, the output motor torque may be ascertained from the motor current drawn. For hydraulic motors, the output torque is proportional to the product of the pressure drop across the hydraulic motor and its displacement. Apart from that, it is possible to ascertain and store a torque characteristic map for any motor as a function of its control variables. From the detected control variables, the control unit is then able to ascertain the motor torque by retrieving the torque characteristic map.

As a further possible operating parameter, at least one sensor may detect the fill ratio of a working unit of the at least one working unit. For detecting the fill ratio of a working unit, sensors may be used that utilize the same physical operating principles for detecting the fill ratio as the aforementioned sensors for ascertaining fill ratios of the material buffer and/or of the conveyor apparatus. The fill ratio of a crushing apparatus may be detected for example by light barriers, by ultrasound and the like.

The working unit may be at least one crushing apparatus of the at least one crushing apparatus and/or may be a screening apparatus of the at least one screening apparatus. It is preferably a crushing apparatus, if present. This is meaningful especially in the case of jaw crushers and cone crushers, but should also not be disregarded for impact crushers and roll crushers. The fill ratio of a crushing apparatus is also a factor in how quickly a supply of material in the material buffer is depleted. A fill ratio of a working unit of the rock processing device is an important factor influencing the material flow in the rock processing apparatus and thus for the discharge or depletion of the material buffer.

As the fill ratio of a conveyor apparatus is related to the conveying speed of the conveyor apparatus, so the fill ratio of a working unit is related to the operating speed of the working unit. Hence, in a preferred development of the present disclosure, an operating speed of a working unit, that is, of at least one crushing apparatus and/or at least one screening apparatus, may be detected.

Additionally or alternatively, it is possible to detect the dimension of a crush gap, that is, in particular the gap width, of a crushing apparatus as the at least one operating parameter. This applies in particular to jaw crushers, impact crushers, cone crushers and roll crushers. In the case of an impact crusher, it is possible to detect in each case a dimension both of an upper as well as of a lower crush gap on an upper and respectively on a lower impact wing and/or the crush gap ratio of said crush gap as the operating parameter. A detection of crush gap dimensions may be performed by detecting a position of an actuator element, which moves a movable component limiting the respective crush gap dimension, so that a position of the actuator element is unequivocally associated with a position of the movable component. Such a component may be a movable crusher jaw or an impact wing. A calibration may be stored in the aforementioned data memory, which links a detected position of the actuator element to a crush gap dimension.

Operating loads may also be detected sensorially as operating parameters, for example the operating load of a drive apparatus, such as a central drive unit of the rock processing apparatus, which converts the energy supplied to it into one or multiple different alternative forms of energy. Such a drive apparatus may be an internal combustion engine, in particular a diesel engine, which converts the inherent calorific value of a fuel into mechanical or kinetic energy on an output shaft. An electric motor is also conceivable as such a drive apparatus, which converts the electrical energy supplied to it into mechanical or kinetic energy on an output shaft. The same applies to a hydraulic motor. In all cases, an operating load may be ascertained for example from a detection of the speed of the output shaft and a torque output at this speed. The detection of speed and torque of a shaft is sufficiently known in the prior art. As was explained above, on the basis of at least one further operating parameter, a motor torque may be retrieved from a torque characteristic map stored in the data memory, in which the motor torque is linked to the at least one further operating parameter.

Alternatively or additionally, the operating load of a working unit may be detected as the at least one operating parameter. In the case of a crushing apparatus, regardless of the concrete type of crusher, there is an input shaft, which supplies kinetic energy to a movable part of the crushing apparatus, such as the movable crusher jaw of a jaw crusher, the rotor of an impact crusher, the cone of a cone crusher or the roll of a roll crusher. Here, the speed of the input shaft, possibly by additional detection and consideration of the torque supplied by the input shaft, may be a measure for the working speed and/or the operating load of the crushing apparatus. The torque of the input shaft is the torque of a machine driving the input shaft, possibly converted by at least one gear situated between the driving machine and the input shaft.

Since the screening apparatus of a rock processing apparatus as a vibrating screening apparatus functions in a similar manner as a vibrating conveyor, the working speed of the screening apparatus may be represented by an amplitude and/or a frequency of a periodic screening movement. The screening apparatus is also driven to perform its periodic movement by a drive shaft. The speed of the drive shaft, possibly with the additional detection and consideration of the torque delivered by the drive shaft, is likewise an indicator of the working speed and/or operating load of a screening apparatus. Thus, a sensor for detecting the working speed or the operating load of the screening apparatus is able to detect the motion amplitude and/or the motion frequency of the screening apparatus and/or a speed and/or a torque of the drive shaft of the respective screening apparatus.

As the fill ratio of a conveyor apparatus is related to the conveying speed of the conveyor apparatus, so the fill ratio of a working unit is related to the operating speed of the working unit. Hence, in a preferred development of the present disclosure, an operating speed of a working unit, that is, of at least one crushing apparatus and/or at least one screening apparatus, may be detected.

A further possible detectable operating parameter is the grain shape and/or the grain size of fed and/or conveyed material and/or the proportion of foreign material in the fed and/or conveyed material, the conveyed material normally having previously been fed into the material feed apparatus. Additionally or alternatively, the distribution of grain sizes, that is, the frequency of the occurrence of individual varied grain sizes or grain size range, in the fed and/or conveyed material may be an operating parameter relevant for the material flow in the rock processing apparatus. Grain shapes and/or grain sizes and grain size distributions and/or the proportion of foreign material may be detected by image processing, for example. Especially the grain size distribution is a determining factor influencing the result of prescreening, which in turn influences the quality of a downstream crushing apparatus and consequently the amount of accruing oversize grain. Foreign material is in particular non-crushable material such as plastic, wood, steel and the like. These foreign materials may interfere with the operational sequence of a rock processing apparatus.

The grain size and/or the grain size distribution and/or the proportion of foreign material of or in fed material is a measure for the potential of spatially occupying the material buffer. During a material feed, larger grains normally distribute less uniformly than smaller grains, due to the impulse received when dumped into the material buffer, and often form lesser dump densities. Foreign material, for example steel reinforcements from reinforced concrete may also hinder an effective feed of material in the material buffer and/or the operation of a downstream conveyor apparatus. Grain shapes and/or grain sizes and grain size distributions and/or the proportion of foreign material may be detected qualitatively and/or quantitatively.

What was said above about the fill ratio of the material buffer and its detection applies mutatis mutandis to a fill ratio of a possibly present further material buffer situated in the flow of material of the rock processing apparatus or of the rock processing system comprising it.

The oversize grain produced when crushing rock material is usually returned into the material buffer and thus contributes to the fill ratio of the material buffer and to its change of behavior over time. Thus, a detection of the quantity of returned oversize grain, in particular of oversize grain returned per unit of time, is also a meaningful operating parameter with respect to the rate of depletion of the material buffer. The quantity of returned oversize grain may be detected optically and/or by image detection and image processing. Additionally or alternatively, the detection of a weight of oversize grain material conveyed per unit of time via a returning oversize grain conveyor belt is conceivable for detecting the quantity of returned oversize grain.

The consideration of a mesh aperture of a screen of a screening apparatus provides information about which grain sizes or grains in which grain size range are moved in the conveyor paths downstream from the screening apparatus in the flow of material. The mesh aperture may be stored as a fixed value in the aforementioned data memory. The mesh aperture may also be detected randomly by a laser scanner or another optical sensor in order to be able to take into account changes in the mesh aperture due to the operation. In the course of their operational lives, meshes may be enlarged by being loaded with heavy rock material. Over time, meshes may also be clogged by sticky material and thus become tighter.

An influential operating parameter is the type of material fed into the rock processing apparatus and conveyed and processed by the latter. The type of material to be processed may be determined by one or multiple qualitative parameters and/or by one or multiple quantitative parameters. According to a classification defined in advance, a qualitative parameter may include for example "hard rock", "soft rock", "reinforced concrete", "milled asphalt material", "asphalt clod", "demolition rubble", "gravel", "railroad ballast" and/or "other".

A quantitative parameter may comprise values determined according to recognized and preferably standardized measuring methods, for example, for density and/or hardness and/or crushability and/or abrasiveness and/or moisture of the fed or conveyed material. According to a classification defined in advance, these parameters may also be determined qualitatively, in particular only qualitatively. For example, parameters may have the qualitative contents "hard", "medium hard", "soft", "good crushability", "average crushability", "poor crushability", "little moisture", "average moisture", "high moisture", etc. The qualitative gradation may comprise more than three grades.

The density may be determined quantitatively for example from an optical volume measurement and simultaneous weighing, for example by a scale integrated in the conveyor apparatus. The moisture of the material may be ascertained by a corresponding moisture sensor. The abrasiveness may be determined by an LCPC test. The crushability of a material may be determined in parallel to the abrasiveness during the LCPC test or may be determined as a Los Angeles value in accordance with DIN EN 1097-2 in the respectively currently valid version.

If the composition of the fed rock is known, then the control unit in response to the input of the respective type of rock via the input device is able to read out corresponding material values such as hardness, density, crushability and abrasiveness from a table stored in the aforementioned data memory. In principle, it is also possible, however, to irradiate the fed material with energy-rich electromagnetic radiation, for example X-ray radiation, and to detect the irradiation response of the material and to draw inferences about the composition of the material and its properties and material characteristic values from the detected irradiation response with the aid of stored data tables.

The state of the material may be classified for example into precrushed and non-precrushed, "precrushed" denoting prior crushing by a rock processing apparatus. Precrushed material may be oversize grain returned in the same rock processing apparatus. Additionally or alternatively, precrushed material may be transferred to the respective rock processing machine by another rock processing apparatus situated upstream in the flow of material. In the case of mixtures of precrushed and non-precrushed material, the state of the material may be indicated by a mixture ratio, in particular a mass-related mixture ratio, of precrushed and non-precrushed material. The state of the material may in principle be detected by image processing like the grain shape, for example. The state may additionally or alternatively be transmitted to the control unit by data transmission by conveying means conveying precrushed and/or non-precrushed material for processing by the respective rock processing apparatus. With the aid of conveying means scales, such as belt scales or bucket scales for example, the respective conveying means is able additionally to transmit quantity information about the material of the respective state.

A further influential operating parameter, which is situated outside of the rock processing apparatus, however, is the size of the loading tool of a loading apparatus discontinuously loading the material buffer. This is for example the volume of a bucket of a backhoe or of a wheel loader as a possible loading apparatus. In principle, this variable may be input via the aforementioned input device or may be transmitted by a respective transmitting device on the loading tool to a receiving device on the rock processing apparatus tuned to the transmitting device. Finally, a sensor on the rock processing apparatus, for example a laser scanner, may detect the size of the loading tool directly or at least a size range assignable to the loading tool. The size of the loading tool is a measure for the quantity of material that can be fed into the material buffer in one material feed. The size, for example the volume, of the loading tool may also be ascertained by detecting the fill ratio change in the material buffer prior to and after a material feed process. Additionally or alternatively, the actual feed quantity may be detected, which was fed or is to be fed into the material buffer.

All the aforementioned parameters influence the flow of material in the rock processing apparatus and thus the rate at which the material buffer is depleted by the processing of rock in the rock processing apparatus.

The detection of several of the aforementioned parameters with the inclusion of the fill ratio of the material buffer during the operation of the rock processing apparatus allows the control unit to detect the change over time of the fill ratio of the material buffer as a function of the other detected operating parameters and by methods of artificial intelligence, such as deep learning for example, or other analytical methods, is able to learn an at least qualitative relationship of dependency between the fill ratio of the material buffer and the other detected operating parameters and use this to predict when a new material feed will be required. With increasing operating time, the predictive accuracy of the control unit by way of its time information thus becomes increasingly more precise.

Additionally or alternatively, a functional relationship or data relationship or multiple functional relationships or data relationships between the fill ratio of the material buffer and one or multiple additional aforementioned operating parameters may be determined in advance by experiment in test operations of the rock processing apparatus and stored in a suitable form in the data memory. Suitable forms are inter alia formulas, characteristic maps, fuzzy sets and the like.

The at least one functional relationship or data relationship ascertained in test operations may be a basis for the prediction of a future development of the fill ratio of the material buffer and thus for ascertaining the time information. It may also be, and this is preferred, the basis for continued learning with the aid of methods of artificial intelligence in the further operation of the rock processing apparatus.

The functional relationships of multiple rock processing devices thus learned or developed further by continued learning may be transmitted to a central data collection point, for example of the manufacturer of the apparatus or of the manufacturer's contract partner, and may be evaluated there and consolidated, for example. After a revision of this kind, the then improved functional relationships may be transmitted to new and/or existing rock processing apparatuses and used by these as the basis for ascertaining the time information as a function of the at least one operating parameter.

As was already explained above, at least one operating parameter or multiple operating parameters may also be supplied to the control unit via the input device, possibly by interposition of the data memory. The control unit is therefore preferably additionally designed to ascertain, in operation with discontinuous material feed, the time information by taking into consideration at least one of the following pieces of information input into the input device: setpoint fill ratio of the material buffer; setpoint fill ratio of at least one conveyor apparatus; setpoint conveying speed of at least one conveyor apparatus; setpoint fill ratio of the crushing apparatus; setpoint dimension of a crush gap of the crushing apparatus; setpoint operating load of at least one drive apparatus; setpoint operating load of the crushing apparatus; setpoint grain size and/or setpoint grain size distribution of fed and/or conveyed material; setpoint quantity of returned oversize grain; setpoint mesh aperture of a screen of the screening apparatus; type of fed and/or conveyed material; size of a loading tool of a loading apparatus discontinuously loading the material buffer.

The designation as "setpoint" indicates that the respective parameter is not detected sensorially, but is rather specified as a setpoint value. For this purpose, the control unit assumes that the rock processing apparatus and its components is operated with respective actual values, which differ from the specified setpoint values only within a predetermined tolerance range and otherwise agree with these to a sufficient degree. This makes it possible to limit the expenditure for the sensorial detection of operating parameters to a few highly relevant operating parameters, which include for example the fill ratio of the material buffer, without thereby suffering excessive loss of predictive accuracy in the time information.

Otherwise, what was said above about the sensorially detected operating parameters respectively applies to the use of the pieces of information input into the input device for ascertaining the time information.

In order to make the time information accessible to third parties, in particular machine operators of loading apparatuses, the output device may be designed to output information in a kind of undirected output independently of the receiver into a spatial region at least partially surrounding the rock processing apparatus and/or adjoining the rock processing apparatus. This preferably means that no receiving device is required in order to present the time information output by the output device in a form that is comprehensible for human beings or for electronic data processing devices.

The output device may thus output the time information in a visually perceivable manner, for example by displaying a time of day, which indicates the calculated earliest possible feed time for the next material feed. Instead of an absolute time of day, it is possible to display the remaining waiting time until the next feed time. This may be done in digital or analog, graphical or numerical fashion. For example, the waiting time until the next feed time may be displayed numerically by a digital clock with a unit of time countdown, for example by seconds or by seconds and minutes. The waiting time may also be displayed graphically-numerically by an analog clock or an analog indicator instrument, for example again with a unit of time countdown by a corresponding continuous or stepped indicator movement. A purely graphical representation of the waiting time, for example as a waiting time bar proportional in length to the remaining waiting time, as an hourglass proportional to the remaining waiting time and the like, is also conceivable. For this purpose, the output device may have a display device visually perceivable from outside of the rock processing apparatus, for example the aforementioned indicator instrument or a monitor with freely configurable graphical depiction or a light bar having a variable illumination dimension and the like.

Alternatively or additionally, the rock processing apparatus may have a receiving device developed separately from a machine body of the rock processing apparatus, which is movable relative to the machine body and is separable or separated from the machine body, in order to ensure that the time information arrives directly where it is actually needed. The output device then outputs the time information by transmitting it to the receiving device. The receiving device itself is designed to output the received time information in a perceptible manner to an operator and/or to process and/or use it to control components of the machine.

In principle, the receiving device may be permanently installed in another apparatus. This is preferably the loading apparatus, particularly preferably an operator's platform of the loading apparatus. In a preferred development of the present disclosure, the receiving device is a portable receiving device such as a smartphone, a tablet computer or a laptop computer, for example. It may then be carried along by a machine operator of the loading apparatus and thus may present the time information to the machine operator even when the latter is not at his loading apparatus. Thus, a timely material feed at the rock processing apparatus may be achieved even if at the time of the output of the time information, the loading apparatus is not immediately ready to feed material.

Due to the interaction between the rock processing apparatus and a loading apparatus required to ensure an operation of the rock processing apparatus at an advantageous operating point, the present disclosure also relates to a machine combination of a rock processing apparatus having a separate, separated or separable receiving device and having a loading apparatus loading the material buffer of the rock processing apparatus in discontinuous fashion. The receiving device is preferably situated in the loading apparatus in order to provide the time information where it is directly needed so as to be able to ensure a timely loading of the material buffer.

The loading apparatus may be a backhoe or a wheel loader, depending on the configuration of the job site, on which the rock processing apparatus or the machine combination is used.

The receiving device may output the time information graphically and/or acoustically to a machine operator of the loading apparatus, for example also via a head-up display, so that the machine operator upon taking note of the time information is able to perform the necessary actions to ensure a timely loading of the material buffer. Additionally or alternatively, the receiving device may be coupled in signal-transmitting fashion to a transport-relevant operating component of the loading apparatus and control this operating component according to the time information. A transport-relevant operating component may be for example at least one actuator on the loading apparatus, which moves a loading tool of the loading apparatus, such as a bucket of the backhoe or wheel loader, for filling the same.

Thus, a partially automated operation assisting the machine operator of the loading apparatus or even a fully automated operation of the loading apparatus via the receiving device is possible, possibly supported by at least one further control unit on the side of the loading apparatus.

The rock processing apparatus may be part of a rock processing system, which comprises multiple rock processing apparatuses. These multiple rock processing apparatuses preferably operate in linked fashion in the sense that a rock processing apparatus upstream in the flow of material feeds its final grain product or one of its final grain products to a material feeding apparatus of a downstream rock processing apparatus. Such a rock processing system is then also to be understood as a rock processing apparatus in the sense of the present application, which has a plurality of rock processing subapparatuses.

DETAILED DESCRIPTION

Figure 1:
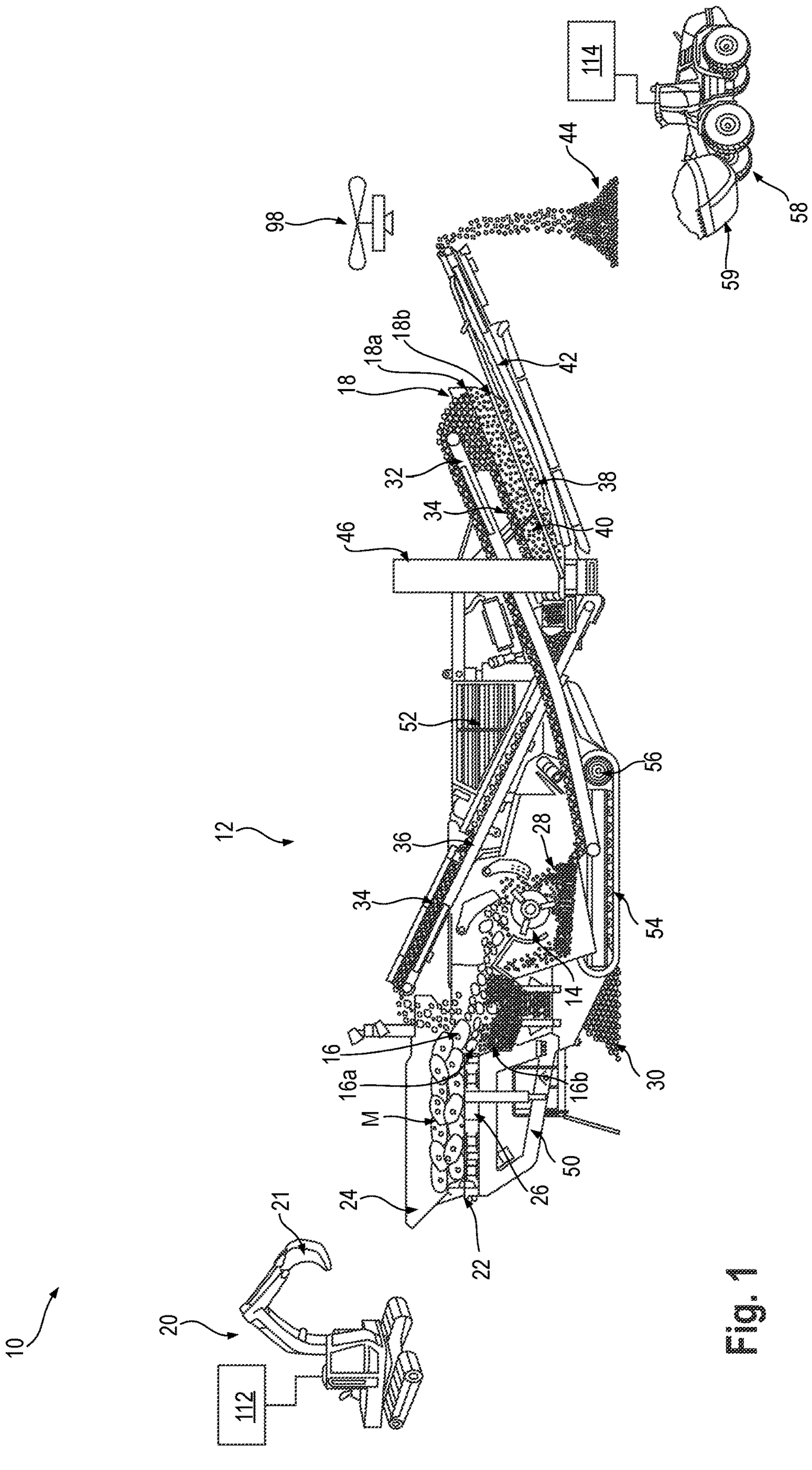
FIG. 1 shows a rough schematic view of a job site with a specific embodiment of a rock processing apparatus according to the present disclosure.

A job site is generally denoted by 10 in FIG. 1. The central implement of the job site 10 is a rock processing apparatus 12 comprising an impact crusher 14 as a crushing apparatus and a pre-screen 16 as well as a post-screen 18 as screening apparatuses. The job site is in the present case preferably a rock quarry but may also be a recycling yard or a demolition site of one or multiple buildings.

Material M to be processed by the rock processing apparatus 12, that is, to be sorted according to size and to be crushed, is fed discontinuously by being loaded by a back-hoe 20 as a loading apparatus of the rock processing apparatus 12 into a material feeding apparatus 22 having a funnel-shaped material buffer 24.

From the material feeding apparatus 22, a vibrating conveyor in the form of a trough conveyor 26 conveys the material M to the pre-screen 16, which comprises two pre-screen decks 16*a* and 16*b*, of which the upper pre-screen deck 16*a* has a greater mesh aperture and separates and feeds to the impact crusher 14 those grain sizes that require crushing according to the respective specifications for the final grain product to be obtained.

Grains falling through the upper pre-screen deck 16*a* are sorted further by the lower pre-screen deck 16*b* into a usable grain fraction 28, which corresponds to the specifications of the final grain product to be obtained and an undersize grain fraction 30, which has a grain size that is so small that it is unusable as value grain.

The number of stockpiles or fractions shown in the exemplary embodiment is provided merely by way of example. The number may be greater or smaller than indicated in the example. Moreover, the undersize grain fraction 30 explained in the present example as waste could also be a value grain fraction if the grain size range accruing in the fraction 30 is usable for further applications.

The usable grain fraction 28 is increased by the crushed material output by the impact crusher 14 and is conveyed to the post-screen 18 by a first conveyor apparatus 32 in the form of a belt conveyor. In the illustrated exemplary embodiment, the post-screen 18 also has two screen decks or post-screen decks 18*a* and 18*b*, of which the upper post-screen deck 18*a* has the greater mesh aperture. The upper post-screen deck 18*a* allows value grain to fall through its mesh and sorts out an oversize grain fraction 34 having a grain size that is greater than the greatest desired grain size of the value grain. The oversize grain fraction 34 is returned by an oversize grain conveyor apparatus 36 into the material input of the impact crusher 14 or into the pre-screen 16. In the illustrated exemplary embodiment, the oversize grain conveyor apparatus 36 takes the form of a belt conveyor.

The useful grain of the useful grain fraction 28 thus comprises oversize grain and value grain. In contrast to the illustration in the exemplary embodiment, the oversize grain conveyor apparatus 36 may also be swiveled outward from a machine frame 50 of the rock processing apparatus 12, so that the oversize grain fraction 34 is stockpiled instead of being returned.

The value grain that fell through the meshes of the upper post-screen deck 18*a* is fractionated further by the lower post-screen deck 18*b* into a fine grain fraction 38 having a smaller grain size and a medium grain fraction 40 having a greater grain size.

Via a fine grain discharge conveyor apparatus 42 in the form of a belt conveyor, the fine grain fraction 38 is heaped to build a fine grain stockpile 44.

Figure 2:
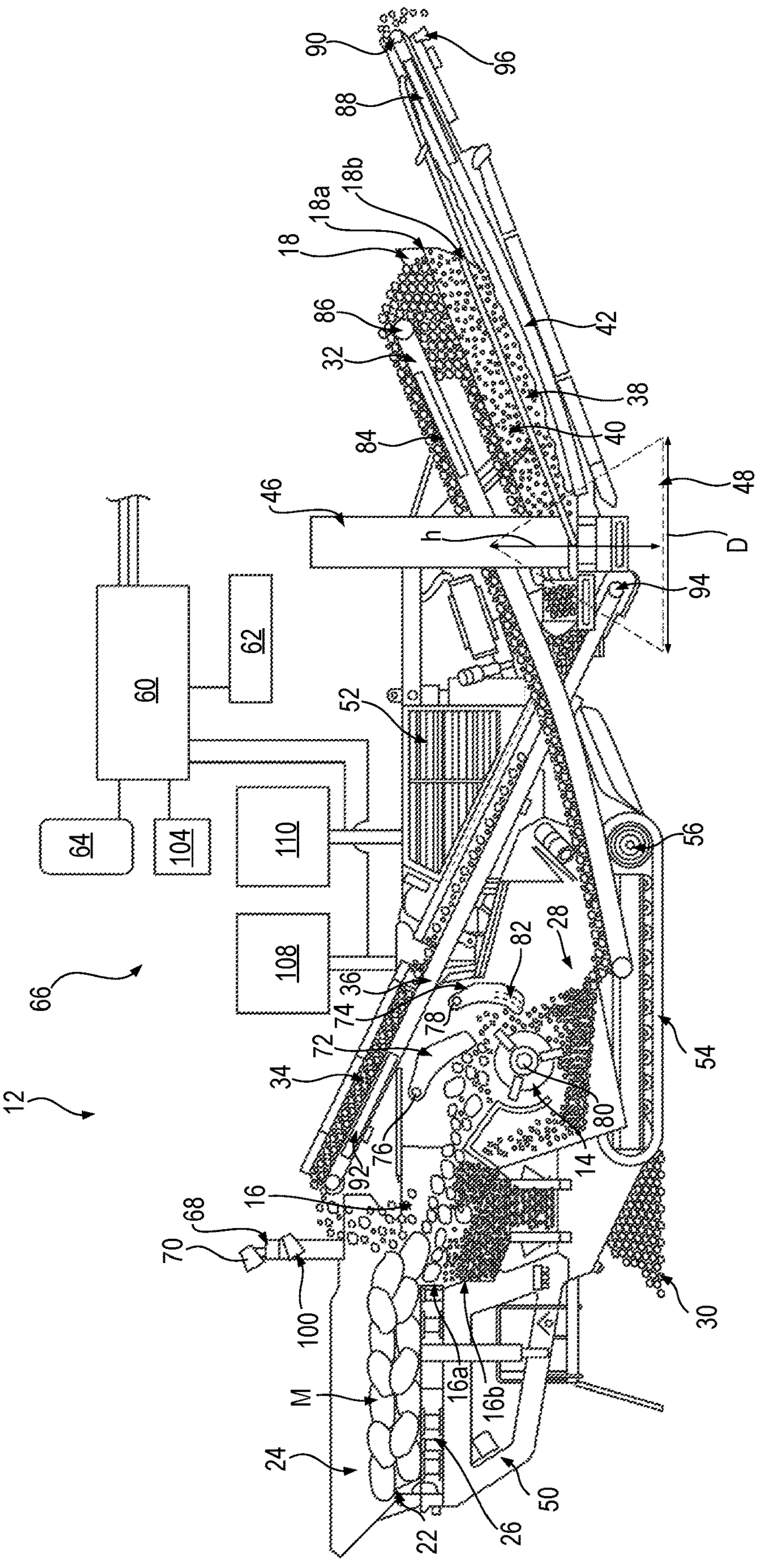
FIG. 2 shows the rock processing apparatus of FIG. 1 in an enlarged schematic lateral view.

Via a medium grain discharge conveyor apparatus 46, likewise in the form of a belt conveyor, the medium grain fraction 40 is heaped to build a medium grain stockpile 48 (not shown in FIG. 1 and shown only in rough schematic fashion in FIG. 2).

As a central structure, the rock processing apparatus 12 has a machine frame 50, on which the mentioned apparatus components are fastened or supported directly or indirectly. As central power source, the rock processing apparatus 12 has a diesel combustion engine 52 supported on the machine frame 50, which generates the entire energy consumed by the rock processing apparatus 12, unless it is stored in energy stores such as batteries, for example. Additionally, the rock processing apparatus 12 may be connected to job site electrical current, if provided on the job site.

In the illustrated example, the rock processing apparatus 12, which may be part of a rock processing system having a plurality of rock processing apparatuses situated in a common flow of material, is a mobile, more precisely a self-propelled, rock processing apparatus 12 having a crawler travel gear 54, which via hydraulic motors 56 as drive of the rock processing apparatus 12 allows for a self-propelled change of location without an external towing vehicle.

A reduction of the value grain stockpiles 44 and 48 and of the stockpile of the undersize grain fraction 30 occurs discontinuously by one or several wheel loaders 58 as an example of a removal apparatus. The stockpile of the undersize grain fraction 30 must also be reduced regularly in order to ensure an uninterrupted operation of the rock processing apparatus 12.

For an operational control that is as advantageous as possible, the rock processing apparatus 12 includes the apparatus components described below with reference to the larger illustration of FIG. 2:

The rock processing apparatus 12 comprises a control unit 60, for example in the form of an electronic data processing system with integrated circuits, which controls the operation of apparatus components. For this purpose, the control unit 60 may either control drives of apparatus components directly, for example, or may control actuators which in turn are able to move components.

The control unit 60 is connected to a data memory 62 in signal-transmitting fashion for exchanging data and is connected to an input device 64 for inputting information. Via the input device 64, for example a touchscreen, a tablet computer, a keyboard and the like, information may be input into the input device 64 and may be stored by the latter in the data memory 62.

The control unit 60 is furthermore connected in signal-transmitting fashion to an output device 66 in order to output information.

For obtaining information about its operating state, the rock processing apparatus 12 furthermore has diverse sensors, which are connected in signal-transmitting fashion to the control unit 60 and thus in the illustrated example indirectly to the data memory 62. For better clarity, the sensors are shown only in FIG. 2.

A camera 70 is situated on a supporting frame 68, which records images of the material feeding apparatus 22 with the material buffer 24 and transmits these to the control unit 60 for image processing. With the aid of camera 70 and by processing the images it records of the material buffer 24 and of the material feeding apparatus 22, the control unit ascertains a local fill ratio of the material buffer 24 by using data relationships stored in the data memory 22.

Furthermore, a vibration amplitude and vibration frequency of the drive (not shown) of the trough conveyor 26 are detected and transmitted to the control unit 60, which ascertains from this information a conveying speed of the trough conveyor 26 and ascertains a conveying capacity of the trough conveyor 26 toward the impact crusher 14 by considering the local fill ratio of the material buffer 24.

With the aid of predetermined data relationships, generated and/or developed by methods of artificial intelligence, the control unit 60 is able to detect from image information of camera 70 a grain size distribution in the material M in the material buffer 24 and even detect the type of material.

In impact crusher 14, an upper impact wing 72 and a lower impact wing 74 are situated in a manner known per se, the rotational position of the upper impact wing 72 being detected by a rotational position sensor 76 and the rotational position of the lower impact wing 74 being detected by a rotational position sensor 78 and being transmitted to the control unit 60. Via the rotational position sensors 76 and 78, the control unit 60 is also able to ascertain a crush gap width of an upper crush gap on the upper impact wing 72 and a crush gap width of a lower crush gap on the lower impact wing 74.

A speed sensor 80 ascertains the speed of the crushing rotor of the impact crusher 14 and transmits it to the control unit 60.

On components such as blow bars, impact wings, impact plates and impact bars, for example, which are particularly subject to wear, wear sensors may be provided which register wear progress, normally in wear stages, and transmit this to the control unit 60. In the illustrated example, for better clarity, a wear sensor system 82 is shown only on the lower impact wing 74.

In the first conveyor apparatus 32, a first belt scale 84 is situated, which detects the weight or the mass of the material of the useful grain fraction 28 transported across it on the first conveyor apparatus 32. Via a speed sensor 86 in a deflection pulley of the conveyor belt of the first conveyor apparatus 32, the control unit 60 is able to ascertain a conveying speed of the first conveyor apparatus 32 and in joint consideration with the detection signals of the first belt scale 84 is able to ascertain a conveying capacity of the first conveyor apparatus 32.

A second belt scale 88 is situated in the fine grain discharge conveyor apparatus 42 and detects the mass or the weight of the fine grain of the fine grain fraction 38 moved across it on the belt of the fine grain discharge conveyor apparatus 42. In the same way, via the speed sensor 90 in a deflection pulley of the conveyor belt of the fine grain discharge conveyor apparatus 42, a conveying speed of the fine grain discharge conveyor apparatus 42 and in joint consideration with the detection signals of the second belt scale 88, a conveying capacity of the fine grain discharge conveyor apparatus 42 can be ascertained by the control unit 60.

A third belt scale 92 is situated in the oversize grain conveyor apparatus 36 and ascertains the weight or the mass of the oversize grain of the oversize grain fraction 34 conveyed across it on the oversize grain conveyor apparatus 36. A speed sensor 94 of a deflection pulley of the conveyor belt of the oversize grain conveyor apparatus 36 ascertains the conveying speed of the oversize grain conveyor apparatus 36 and transmits it to the control unit 60, which in joint consideration with the detection signals of the third belt scale 92 is able to ascertain a conveying capacity of the oversize grain conveyor apparatus.

Figure 3:
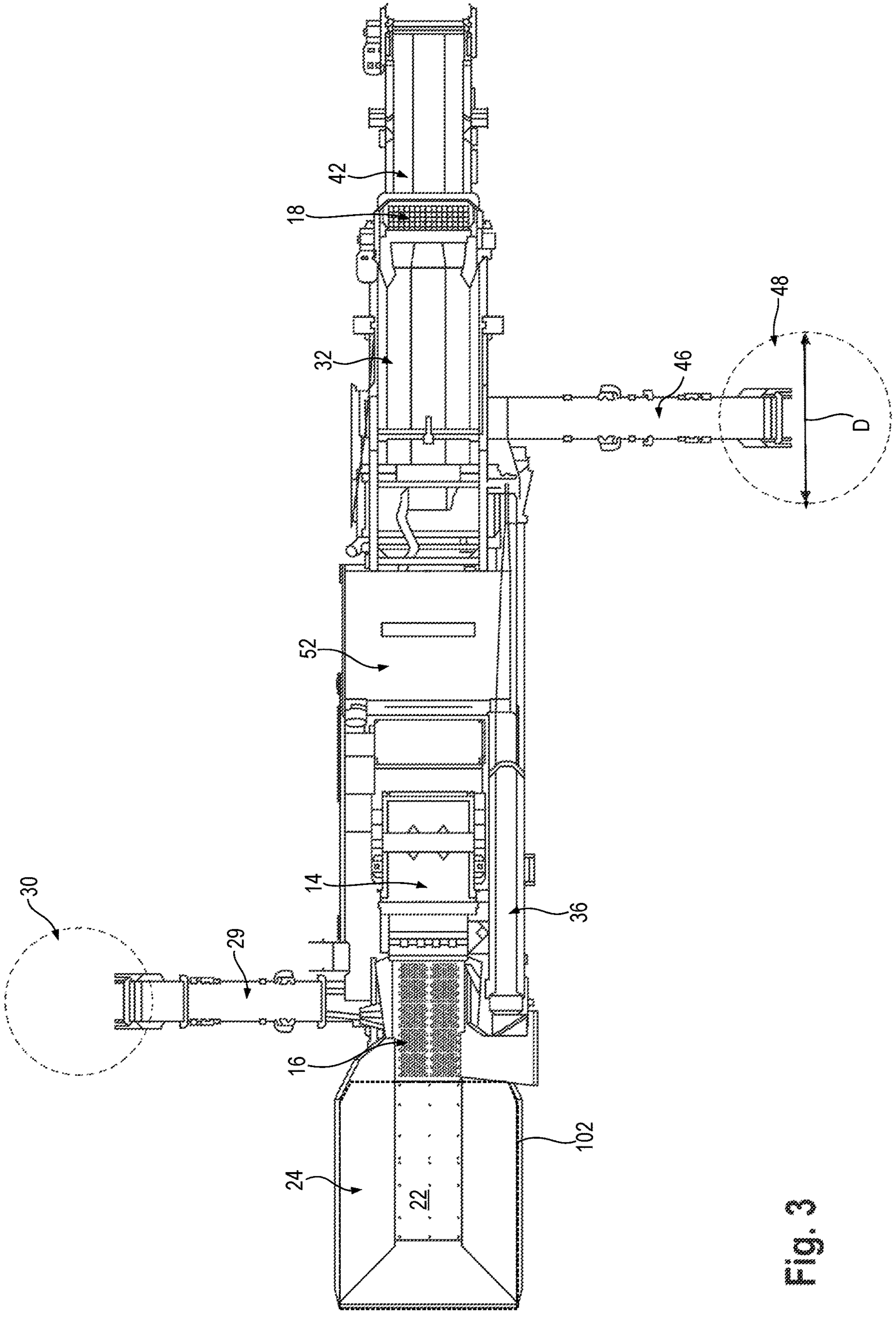
FIG. 3 shows the rock processing apparatus of FIG. 2 in an enlarged schematic top view.

At the discharge-side longitudinal end of the fine grain discharge conveyor apparatus 42, a first stockpile sensor 96 is situated, which as a camera records images of the fine grain stockpile 44 and transmits these as image information to a control unit 60, which detects contours of the fine grain stockpile 48 by image processing and on the basis of the known image data of the camera of the first stockpile sensor 96 starting from the detected contours ascertains a shape and from that a volume of the fine grain stockpile 48. For this purpose, to simplify its information ascertainment, the control unit 60 may assume an ideal conical shape of the fine grain stockpile 48 and ascertain the volume of an ideal cone approximating the real fine grain stockpile 48 without excessive error. Thus, it may suffice if a stockpile sensor ascertains the diameter D of the base area of a stockpile and the height h of the stockpile, as is shown in FIGS. 2 and 3 in the example of stockpile 48.

FIG. 1 shows a second stockpile sensor 98 that can be used alternatively or additionally. The second stockpile sensor 98 comprises a drone capable of flying as a carrier, which may be remote controlled in its movement by control unit 60. The second stockpile sensor 98 is also used to ascertain at least a height of the fine grain stockpile 48, preferably, however, to ascertain its shape and thus its volume. An advantage of using a drone or a sensor installed at an elevated location, for example on a high mast or post, is that one sensor is able to detect more than one stockpile with respect to its height and/or its shape and/or its volume. A number of sensors that is lower than the number of stockpiles to be detected at the rock processing apparatus 12, at a rock processing system or at the job site 10 may then suffice in order to detect every one of the stockpiles to be detected. Preferably, exactly one sensor will then suffice in order to detect all of the stockpiles to be detected.

Each discharge conveyor apparatus producing a stockpile preferably has at least one stockpile sensor or cooperates with a stockpile sensor.

The other discharge conveyor apparatuses, such as the medium grain discharge apparatus 46 and an undersize grain discharge apparatus 29, preferably also have belt scale and a speed sensor for detecting the quantity of material transported on the respective conveyor apparatus, the conveying speed and hence the conveying capacity.

The output device 66 may have a projection device 100, for example on the supporting frame 68, in order to project a marker within the overall feed area 102 shown in FIG. 2, which is identical with the feed opening of the material buffer 24. The overall feed area 102 is chosen is such a way that a grain falling along the direction of the force of gravity reaches the material feeding apparatus 22 without falling directly onto the pre-screen 16.

Figure 5:
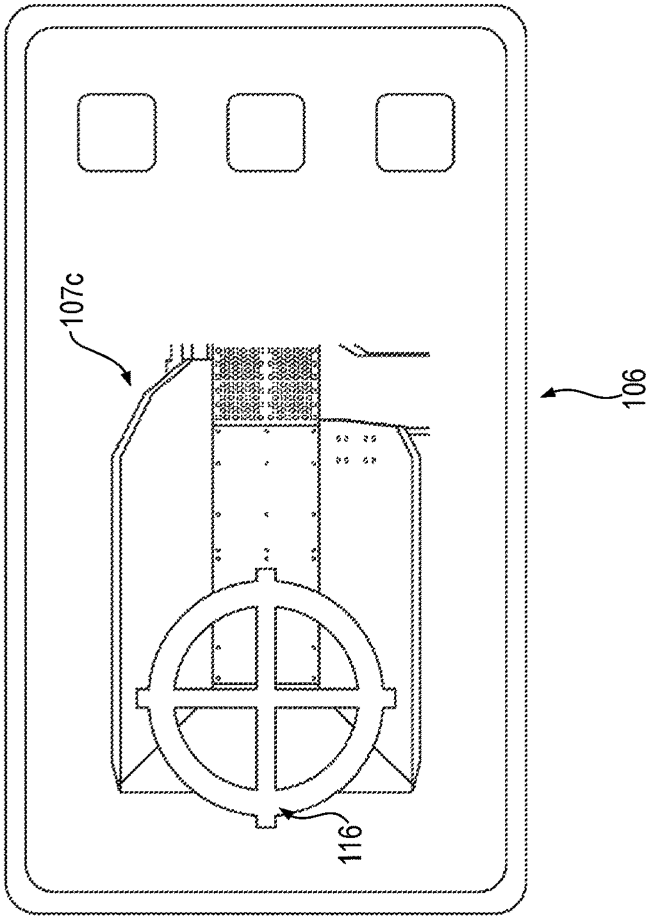
FIG. 5 shows a rough schematic view of a receiving device for outputting location information for a material feed to a material feeding apparatus of the rock processing apparatus.
Figure 4:
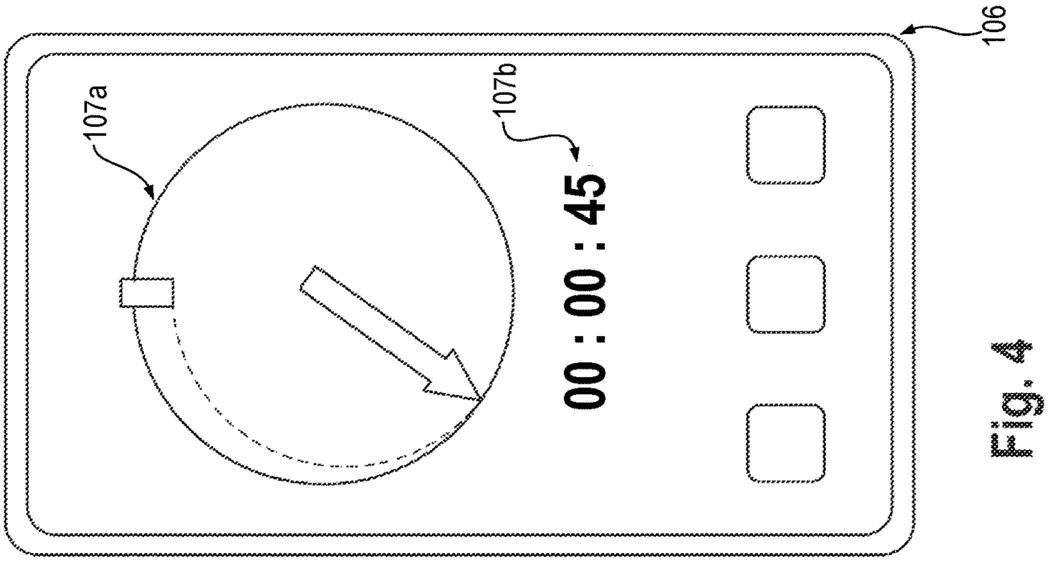
FIG. 4 shows a rough schematic view of a receiving device for outputting time information.

The output device 66 further comprises a transmitting/receiving unit 104, which in wireless fashion and in a suitable data protocol is able to transmit data to and receive data from a receiving device set up for communication with it, for example the receiving device 106 in FIGS. 4 and 5.

The output device 66 further includes a first display device 108, for example in the form of a monitor, for the externally perceptible display of time information about a next material feed into the material feeding apparatus 22. In the illustrated specific embodiment, the output device 66 also includes a second display device 110, for example again a monitor, for the externally perceptible display of time information and location information about a next stockpile reduction. For this purpose, the display device 110 indicates not only time information as to when a next stockpile reduction should begin, but also location information as to which of the stockpiles should be reduced at the indicated time, and possibly also by what amount the indicated stockpile should be reduced.

The backhoe 20 further comprises a transmitting/receiving device 112 including a data memory, which is set up for communication with the transmitting/receiving unit 104 of the rock processing apparatus 12. The transmitting/receiving device 112 is thus able to transmit to the transmitting/receiving unit 104 relevant data about the backhoe 20, such as the holding capacity of its bucket 21 as its loading tool and/or its current GPS data.

The wheel loader 58 accordingly comprises a transmitting/receiving device 114 including a data memory, which is set up for communication with the transmitting/receiving unit 104 of the rock processing apparatus 12. The transmitting/receiving device 112 is thus able to transmit to the transmitting/receiving unit 104 relevant data about the wheel loader 58, such as the holding capacity of its bucket 59 as its removal tool and/or its current GPS data.

In the illustrated example, the data memory 62 contains multiple data relationships, which link operating parameters and/or material parameters with one another. These data relationships may be ascertained in advance by test operations with specific parameter variations and stored in the data memory 62. In particular for more complex multidimensional data relationships, the use of methods of artificial intelligence is helpful for ascertaining causal relationships between operating parameters and/or material parameters. In the further operation of the rock processing apparatus 12, the data relationships thus ascertained may be continuously verified, refined and/or corrected, again preferably using methods of artificial intelligence.

The discontinuous material feed naturally results in a surge-like material feed, a surge of fed material being limited by the size of the bucket 21 of the backhoe 20. The time intervals between two discontinuous material feeds are not predictable and will fluctuate.

To avoid interruptions in the operational sequence of the rock processing apparatus 12, the control unit 60 ascertains on the basis of detection signals of one or multiple of the previously mentioned sensors a piece of time information, which represents an execution time of a future, in particular next, material feed into the material feeding apparatus 22.

For this purpose, the control unit 60 preferably uses the ascertained locally differentiated fill ratio of the material buffer 24 and takes into consideration the conveying capacities of the trough conveyor 26 and for example of the undersize grain conveyor apparatus 29 as well as of the first conveyor apparatus 32. An analysis of the material streams of the trough conveyor 26 into the impact crusher 14 and of the undersize grain conveyor apparatus 29 and the first conveyor apparatus 32 away from the impact crusher 14 indicates whether the fill ratio of the impact crusher 14 changes over time, for example grows or diminishes, and thus indicates whether the conveying capacity of the trough conveyor 26 can be maintained or must be changed. The conveying capacity of the trough conveyor 26, however, determines how quickly the material buffer 24 is depleted and should be loaded again with material. Alternatively or additionally, a sensor may also be provided on the rock processing apparatus 12 for detecting the fill ratio of the impact crusher 14 directly.

The control unit 60 also considers the quantity of returned oversize grain, since the oversize grain fraction 34 also contributes to the fill ratio of the material buffer 24.

A predefined data relationship stored in the data memory 62 may link the detection signals of the camera 70, of the first belt scale 84, of the speed sensor 86, of a belt scale and a speed sensor on the undersize grain discharge conveyor apparatus, of the belt scale 92 and of the speed sensor 94 of the oversize grain conveyor apparatus 36 and of the size of the bucket 21 of the backhoe 20, possibly by taking the distance of the backhoe 20 from the material feeding apparatus 22 into consideration, as input variable with a piece of time information as the output variable, which indicates when a next material feed into the material feeding apparatus 22 is to take place. This time information on the one hand may be displayed on the first output device 108 in a suitable form, for example as an hourglass, waiting time bar, time countdown or analog clock representation, perceptible for anyone within visual range of the rock processing apparatus 20.

The time information may also be transmitted by the transmitting/receiving unit 104 to a mobile receiving device 106, which is available to the machine operator of the backhoe 20. The mobile receiving device 106 may be a portable mobile device, such as a mobile telephone, a tablet computer and the like, or may be permanently installed in the backhoe as part of its control unit and may remain in the backhoe 20.

FIG. 4 shows by way of example a representation of a piece of time information on the receiving device 106 both graphically in the upper half by indicator representation 107*a* as well as alphanumerically in the lower half by time countdown 107*b*. In the illustrated case, a next material feed is desired in 00 minutes and 45 seconds.

The control unit 60 is thus able successively to control the discontinuous material feed and able to ensure a good flow of material in the rock processing apparatus 12 in spite of the discontinuity of the material feed.

Due to the local or regional resolution of the fill ratio in the material feeding apparatus 22 or in material buffer 24, the control unit 60 on the basis of a further data relationship stored in the data memory 62 is also able to control the next material feed not only in terms of time, but also spatially within the overall feed area 102 of the material buffer 24 or material feeding apparatus 22 or to indicate a piece of location information about a preferred material feed location within the overall feed area 102.

For the specific construction type of the material feeding apparatus 22 and the rock processing apparatus 12 as a whole, which may be identified parametrically in the data memory 62 so as to be usable for the control unit 60, the control unit 60 is thus able to advance the loading of the material buffer 24 in the most advantageous manner possible over the entire operating time of the rock processing apparatus 12.

Local overfilling of the material buffer 24 may thus be avoided as well as a direct feed of material onto the pre-screen 16. Furthermore, in places where locally the fill ratio within the material buffer 24 has fallen sharply, material may be fed to ensure an advantageous material bed in the material feeding apparatus 22.

On the basis of a predetermined data relationship, the control unit 60 is thus able to output location information to the machine operator of the backhoe 20 indicating where a next material feed should be provided within the overall feed area 102.

Via the projection device 100, the output device 66 is able to output this location information in a manner that is visible for everyone in that the projection device 100 within the overall feed area 102 or within the material buffer 24 projects a marker at the location at which the next material feed should take place.

Additionally or alternatively, the location information, as previously already the time information for the next material feed, may be output via the receiving device 106 to the machine operator of the backhoe 20. FIG. 5 shows an exemplary embodiment for a location information output. The receiving device 106 displays a schematic rendering 197*c* of the material buffer 24 with the overall feed area 102 and marks therein by a suitable marker 116 the desired feed location within the overall feed area 102 for the next material feed. Additionally, a preferred discharge height or a discharge height range may be indicated quantitatively, for example in meters and/or centimeters, or qualitatively, for example by indicating qualitative discharge height parameters such as "low", "medium" and "high". Particularly when communicating the location information to a, possibly partially automatic, backhoe control, the additional height information may be readily implemented.

Using the first stockpile sensor 96 and/or the second stockpile sensor 98 at the respective discharge conveyor apparatuses 29, 42 and 46, the control unit 60 is able to detect a growth of the stockpiles 30, 44 and 48 produced by the rock processing apparatus 12 by considering material parameters such as the type of the fed material, the grain size and grain size distribution and the bulk density possibly resulting therefrom, and is able above all to detect a rate of change or growth rate of the respective stockpile and, by using a previously produced and stored data relationship, to ascertain a piece of reduction time information indicating when a particular stockpile should be reduced by the wheel loader 58. This makes it possible to prevent the stockpile from growing excessively and from blocking a discharge via the discharge conveyor apparatus producing the respective stockpile.

Furthermore, by taking into consideration material parameters, such as the grain size and grain size distribution as well as the density, the control apparatus, by using a data relationship ascertained for this purpose, is able to ascertain a further piece of reduction information, which indicates to what extent a reduction is to take place.

If the rock processing apparatus 12, as in the present case, produces multiple stockpiles, then the output device 66 additionally outputs a further piece of reduction information, which identifies the stockpile to which the reduction time information pertains.

The control unit 60 is able to display the reduction time information and the further pieces of reduction information on the second display device 110 so as to be perceptible to anyone within the visual range of the rock processing apparatus 12. Additionally or alternatively, the output device 66 may transmit, via the transmitting/receiving unit 104, the pieces of information about the next stockpile reduction to the receiving device 106, where it is output to the machine operator of the wheel loader 58 in graphical and/or alphanumerical fashion.

Finally, from detection signals of suitable sensors, the control unit 60 is able to control operating parameters of the rock processing apparatus 12 in such a way that a predetermined desired ratio of fine grain quantity and medium grain quantity is obtained in the illustrated exemplary embodiment. In the same way, on the basis of appropriately prepared data relationships, the control unit 60 is able to control the rock processing apparatus 12 in such a way that its energy consumption per unit of quantity of processed mineral material reaches or is reduced to at least a local minimum. Additionally or alternatively, by using appropriately prepared data relationships, the control unit 60 is able to control the rock processing apparatus 12 in such a way that a quantity of oversize grain advantageous for the respective crushing process is returned so that a sufficient amount of support grain is present in the crush gap or in the crush gaps in the form of pre-crushed oversize grain. Indeed, an operation with the aim of minimizing or eliminating the amount of oversize grain is not necessarily the most economical operation of the rock processing apparatus 12 due to the advantageous effects of oversize grain as support grain in the crush gap. Frequently, a very small amount of oversize grain implies an excessively large amount of material that is crushed too finely, which is normally not desired. If the amount of returned material decreases, the quality of the final product often decreases along with it, since the final product then contains less repeatedly crushed material.

On the basis of the available data relationships ascertained in advance by test operations with specific parameter variation, the control unit 60 may also aim for an operation of the rock processing apparatus 12 on the basis of multiple target variables or one target variable with further specified boundary conditions, such as for example the production of value grain having different grain sizes in a predetermined quantitative proportion at lowest possible energy consumption and at the most advantageous amount of returned oversize grain.

For setting the operation of the rock processing apparatus 12 in accordance with the output variables of the at least one utilized data relationship, the control unit 60 may change the conveying speed of one or multiple conveyor apparatuses, may change the crush gap width, in particular of the upper and/or of the lower crush gap, may change the rotor speed, may control the material feed into the material feeding apparatus 22 spatially and temporally, etc.

The input variables used for optimizing the operation may be the size and/or the height and/or the growth of value grain stockpiles, presently for example the value grain stockpiles 44 and 48, the size and/or the height and/or the growth of the stockpile of the undersize grain fraction 30, the quantity of returned oversize grain, the fed grain size and fed grain size distribution, which are primarily ascertainable via the material parameters input via the input device 64. The input material parameters may comprise at least one material parameter of: the type of material, degree of humidity, hardness, density, crushability, abrasiveness, proportion of foreign substances in the fed and/or processed material, etc., the grain size and grain size distribution in the individual discharge conveyor apparatuses. The enumeration is not conclusive. In the discharge conveyor apparatuses, the grain size and grain size distribution, possibly also the grain shape, may be ascertained by cameras with subsequent image processing. The grain size and the grain size distribution in a discharge conveyor apparatus may be ascertained additionally or alternatively by the occupancy of a screening device upstream of the respective discharge conveyor apparatus in the flow of material. Additionally or alternatively, the desired setpoint quantity of a respective final product may be used as input variable for optimizing the operation.

By application of methods of artificial intelligence, the control unit 60, if desired with the involvement of powerful external data processing devices, is able continuously to improve the targeted precision of the stored data relationships by its daily operation and the data and findings gathered in the process.

The rock processing apparatus 12 itself is thus not only able to improve its own operation but is basically able successively to take over the organization of the entire job site in the vicinity of the rock processing apparatus 12.

What is claimed is:

1. A rock processing apparatus, comprising:
- a material feeding apparatus having a material buffer configured to load starting material to be processed;
- at least one working unit;
- at least one conveyor apparatus configured to convey material between apparatus components;
- at least one sensor configured to transmit a detection signal representing an execution time of a future material feed into the material feeding apparatus;
- a control unit connected to the at least one sensor and configured to
  - ascertain, in an operation with discontinuous material feed of starting material to be processed, time information based on the at least one detection signal and representing an execution time of a future material feed into the material feeding apparatus, and
  - control apparatus components of the rock processing apparatus; and
- at least one output device connected to the control unit and configured to transmit output information comprising the ascertained time information.

2. The rock processing apparatus of claim 1, wherein the control unit is configured to ascertain, in the operation with discontinuous material feed, an individual execution time as time information for at least first and second successive future material feeds and to output the individual execution times respectively via the output device.

3. The rock processing apparatus of claim 1, further comprising:
- an input device operatively connected to the control unit and configured, in the operation with discontinuous material feed, to ascertain the time information based on the at least one detection signal representing an execution time of a future material feed into the material feeding apparatus and information input into the input device.

4. The rock processing apparatus of claim 1, wherein the at least one sensor is configured to detect, and to transmit to the control unit detection signals representing, at least one operating parameter from the group consisting of: a fill ratio of the material buffer; a fill ratio of the at least one conveyor apparatus; a conveying speed of the at least one conveyor apparatus; a fill ratio of at least one working unit; a grain shape and/or a grain size and/or a grain size distribution of fed and/or conveyed material; a type of fed and/or conveyed material; a humidity of the fed material; a density of the fed material; a hardness of the fed material; a crushability of the fed material; an abrasiveness of the fed material; a state of the fed material; a quantity of returned oversize grain; a feed quantity of material to be fed or already fed; an operating load of at least one drive apparatus; an operating load of the at least one working unit; a working speed of the at least one working unit; a dimension of a crush gap of the at least one working unit; a mesh aperture of a screen of the at least one working unit; a size of a loading tool of a loading apparatus discontinuously loading the material buffer; and a quantity or proportion of non-crushable foreign material.

5. The rock processing apparatus of claim 3, wherein the control unit is configured to ascertain, in the operation with discontinuous material feed, the time information by taking into consideration information input into the input device and selected from the group consisting of: a setpoint fill ratio of the material buffer; a setpoint fill ratio of the at least one conveyor apparatus; a setpoint conveying speed of the at least one conveyor apparatus; a setpoint fill ratio of the at least one working unit; a setpoint dimension of a crush gap of the at least one working unit; a setpoint operating load of at least one drive apparatus; a setpoint operating load of the at least one working unit; a setpoint grain size and/or setpoint grain size distribution of fed and/or conveyed material; a setpoint quantity of returned oversize grain; a setpoint mesh aperture of a screen of the working unit; a type of fed and/or conveyed material; a size of a loading tool of a loading apparatus discontinuously loading the material buffer.

6. The rock processing apparatus of claim 1, wherein the output device is configured to output information independently of a receiver in a spatial area surrounding the rock processing apparatus at least partially and/or adjoining the rock processing apparatus.

7. The rock processing apparatus of claim 1, wherein the control unit is configured to control the discontinuous material feed based at least in part on the ascertained time information.

8. The rock processing apparatus of claim 1, further comprising a receiving device developed separately of a machine body of the rock processing apparatus and movable relative to the machine body and separable or separated from the machine body, the output device configured to transmit output information comprising the time information to the receiving device.

9. The rock processing apparatus of claim 8, wherein the receiving device is a portable receiving device.

10. A machine combination comprising:
- a rock processing apparatus comprising
  - a material feeding apparatus having a material buffer configured to load starting material to be processed,
  - at least one working unit,
  - at least one conveyor apparatus configured to convey material between apparatus components,
  - at least one sensor configured to transmit a detection signal representing an execution time of a future material feed into the material feeding apparatus,
  - a control unit connected to the at least one sensor and configured to ascertain, in an operation with discontinuous material feed of starting material to be processed, time information based on the at least one detection signal representing an execution time of a future material feed into the material feeding apparatus, and to control apparatus components of the rock processing apparatus, and
  - at least one output device connected to the control unit and configured to transmit output information comprising the ascertained time information; and
- a loading apparatus configured to discontinuously load the material buffer of the rock processing apparatus, and comprising a receiving device,
- wherein the output device is configured to transmit output information comprising the time information to the receiving device.

11. The machine combination of claim 10, wherein the receiving device is configured to output the time information graphically and/or acoustically to a display device of the loading apparatus.

12. The machine combination of claim 10, wherein the receiving device is configured to control a transport-relevant operating component of the loading apparatus based at least in part on the time information.

13. The machine combination of claim 10, wherein the control unit is configured to ascertain, in the operation with discontinuous material feed, an individual execution time as time information for at least first and second successive future material feeds and to output the individual execution times respectively via the output device.

14. The machine combination of claim 10, the rock processing apparatus further comprising:

an input device operatively connected to the control unit and configured, in the operation with discontinuous material feed, to ascertain the time information based on the at least one detection signal representing an execution time of a future material feed into the material feeding apparatus, and information input into the input device.

15. The machine combination of claim 10, wherein the at least one sensor is configured to detect, and to transmit to the control unit detection signals representing, at least one operating parameter from the group consisting of: a fill ratio of the material buffer; a fill ratio of the at least one conveyor apparatus; a conveying speed of the at least one conveyor apparatus; a fill ratio of at least one working unit; a grain shape and/or a grain size and/or a grain size distribution of fed and/or conveyed material; a type of fed and/or conveyed material; a humidity of the fed material; a density of the fed material; a hardness of the fed material; a crushability of the fed material; an abrasiveness of the fed material; a state of the fed material; a quantity of returned oversize grain; a feed quantity of material to be fed or already fed; am an operating load of at least one drive apparatus; an operating load of the at least one working unit; a working speed of the at least one working unit; a dimension of a crush gap of the at least one working unit; a mesh aperture of a screen of the at least one working unit; a size of a loading tool of a loading apparatus discontinuously loading the material buffer; and a quantity or proportion of non-crushable foreign material.

16. The machine combination of claim 14, wherein the control unit is configured to ascertain, in the operation with discontinuous material feed, the time information by taking into consideration information input into the input device and selected from the group consisting of: a setpoint fill ratio of the material buffer; a setpoint fill ratio of the at least one conveyor apparatus; a setpoint conveying speed of the at least one conveyor apparatus; a setpoint fill ratio of the at least one working unit; a setpoint dimension of a crush gap of the at least one working unit; a setpoint operating load of at least one drive apparatus; a setpoint operating load of the at least one working unit; a setpoint grain size and/or setpoint grain size distribution of fed and/or conveyed material; a setpoint quantity of returned oversize grain; a setpoint mesh aperture of a screen of the at least one working unit; a type of fed and/or conveyed material; a size of a loading tool of a loading apparatus discontinuously loading the material buffer.

17. The machine combination of claim 10, wherein the output device is configured to output information independently of a receiver in a spatial area surrounding the rock processing apparatus at least partially and/or adjoining the rock processing apparatus.

* * * * *